United States Patent
Wang et al.

(10) Patent No.: US 10,520,912 B2
(45) Date of Patent: Dec. 31, 2019

(54) ROBOT CONTROLLER HAVING FUNCTION THAT SIMPLIFIES LEARNING, AND ROBOT CONTROL METHOD

(71) Applicant: FANUC CORPORATION, Yamanashi (JP)

(72) Inventors: Kaimeng Wang, Yamanashi (JP); Shuusuke Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 99 days.

(21) Appl. No.: 15/815,893

(22) Filed: Nov. 17, 2017

(65) Prior Publication Data

US 2018/0164773 A1 Jun. 14, 2018

(30) Foreign Application Priority Data

Dec. 13, 2016 (JP) .................. 2016-241632

(51) Int. Cl.
*G05B 19/425* (2006.01)
*G05B 19/19* (2006.01)
(Continued)

(52) U.S. Cl.
CPC ............... *G05B 19/19* (2013.01); *B25J 9/16* (2013.01); *B25J 9/163* (2013.01); *B25J 13/06* (2013.01); *G05B 13/04* (2013.01); *G05B 13/048* (2013.01); *G05B 2219/40382* (2013.01); *G05B 2219/40385* (2013.01); *G05B 2219/40519* (2013.01); *G05B 2219/45083* (2013.01)

(58) Field of Classification Search
CPC ....... B25J 9/163; B25J 9/1694; B23K 11/115; G05B 19/19; G05B 2219/45083; G05B 13/048; G05B 2219/39195; G05B 2219/45104; G05B 2219/40547; Y10S 901/46; Y10S 901/47
USPC ............ 700/258, 253, 245, 254; 901/46, 47; 318/568.1, 568.12, 568.22, 568.15
See application file for complete search history.

(56) References Cited

U.S. PATENT DOCUMENTS

| | | | |
|---|---|---|---|
| 6,522,949 B1 * | 2/2003 | Ikeda | G05B 19/425 219/121.63 |
| 8,121,731 B2 * | 2/2012 | Ban | B25J 9/1656 700/245 |

(Continued)

FOREIGN PATENT DOCUMENTS

| | | |
|---|---|---|
| JP | H1-211102 A | 8/1989 |
| JP | H3-31907 A | 2/1991 |

(Continued)

*Primary Examiner* — Dalena Tran
(74) *Attorney, Agent, or Firm* — Hauptman Ham, LLP

(57) ABSTRACT

A robot controller having a function that simplifies learning and a robot control method. The robot controller includes: a learning section configured to carry out learning of detecting a deviation between a commanded trajectory representing a position of the robot generated according to the command values and an operation trajectory representing an actual position where the robot has moved, and generate a corrected program by adjusting the commanded trajectory; a saving section configured to save the corrected program; and a relearning section configured to carry out relearning on a relearning location, the relearning location being a part of the operation trajectory designated by an operator.

5 Claims, 3 Drawing Sheets

(51) Int. Cl.
*B25J 9/16* (2006.01)
*G05B 13/04* (2006.01)
*B25J 13/06* (2006.01)

(56) References Cited

U.S. PATENT DOCUMENTS 8,271,131 B2 * 9/2012 Kato .................... G05B 19/404
700/246
8,886,359 B2 * 11/2014 Inaba ...................... B25J 9/163
700/245

FOREIGN PATENT DOCUMENTS

| | | |
|---|---|---|
| JP | H6-348316 A | 12/1994 |
| JP | H7-32279 A | 2/1995 |
| JP | H7-334228 A | 12/1995 |
| JP | 2003-44102 A | 2/2003 |
| JP | 2004-234327 A | 8/2004 |
| JP | 2006-236103 A | 9/2006 |
| JP | 2011-150648 A | 8/2011 |
| JP | 2015-79491 A | 4/2015 |
| JP | 2015-168053 A | 9/2015 |
| JP | 2015-221491 A | 12/2015 |
| WO | 2010/067651 A1 | 6/2010 |

* cited by examiner

ROBOT CONTROLLER HAVING FUNCTION THAT SIMPLIFIES LEARNING, AND ROBOT CONTROL METHOD

RELATED APPLICATIONS

The present application claims priority to Japanese Patent Application No. 2016-241632 filed on Dec. 13, 2016, the disclosure of which is hereby incorporated by reference herein in its entirety.

BACKGROUND OF THE INVENTION

1. Field of the Invention

The present invention relates to a robot controller having a function that simplifies learning and to a robot control method.

2. Description of the Related Art

In a robot controlled by an operation program, generally, a motor is controlled in accordance with command values included in the operation program, and the robot is moved so as to trace a commanded trajectory taught with the operation program. There are currently cases in which a motor cannot track the command values due to backlash, friction, etc., in each joint of the robot, and the actual position of the robot (the actual trajectory) contains error with respect to the commanded trajectory.

Techniques are known that carry out learning, in which a deviation between the commanded trajectory and the actual trajectory is detected and the command values are iteratively adjusted, in order to eliminate such error. For example, JP 2015-221491 A discloses a robot control method including: a step of generating a first trajectory representing an actual position of a tool center point by launching a user program to move a robot along a first continuous programmed path; a step of calculating a path deviation between the first continuous programmed path and the first trajectory; a step of generating a corrected user program by adjusting the user program by a calculated amount equivalent to the path deviation; a step of saving the first trajectory representing the actual position of the tool center point in a memory device; a step of generating a second trajectory representing an actual position of the tool center point by launching the corrected user program to move the robot along a second continuous programmed path; and a step of displaying the first trajectory and the second trajectory.

JP 2015-168053 A discloses a robot controller that controls a robot operated in a predetermined work region while correcting its own position and orientation, the robot controller including: a storage unit that stores a reference operation pattern of the robot; an input unit that specifies at least one of a work start region where the operation of the robot based on the reference operation pattern is started and a work end region where the operation of the robot based on the reference operation pattern ends; an automatic generation unit that automatically generates a plurality of operation patterns for the robot on the basis of division regions obtained by dividing the work region specified by the input unit at a predetermined resolution and the reference operation pattern stored in the storage unit; and a learning control unit that, for each of the operation patterns automatically generated by the automatic generation unit, learns an operation acceleration rate for changing a speed or an acceleration and speeding up the operation of the robot.

Furthermore, JP 2003-044102 A discloses a learning control method for a learning control system. The system includes a memory that stores data necessary for learning control, a means for dividing and using the memory into several regions, a means for replacing data in a region specified by an operation program, and a control unit. In the system, the control unit iterates trials so that the output of a control target follows a target command. In the method, it is determined whether or not a command has been inputted to the control unit, and a point in time when a result of the determination matches a learning start command received by the learning control system is taken as a learning starting point.

Normally, learning results are applied to the entirety of a trajectory. Thus, even if a part of the post-learning trajectory is not a trajectory desired by an operator, it is difficult to carry out learning to correct only that part of the trajectory. Although there are techniques for automatically switching between segments where learning is carried out and segments where learning is not carried out, algorithms and arithmetic processing, etc., for such techniques may be complicated.

SUMMARY OF THE INVENTION

One aspect of the present disclosure is a robot controller configured to control operations of a robot in accordance with command values of a program, the controller including: a learning section configured to carry out learning of detecting a deviation between a commanded trajectory representing a position of the robot generated according to the command values and an operation trajectory representing an actual position where the robot has moved, and generate a corrected program by adjusting the commanded trajectory; a saving section configured to save the corrected program; and a relearning section configured to carry out relearning on a relearning location, the relearning location being a part of the operation trajectory designated by an operator.

Another aspect of the present disclosure is a robot control method of controlling operations of a robot in accordance with command values of a program, the method including: carrying out learning of detecting a deviation between a commanded trajectory representing a position of the robot generated according to the command values and an operation trajectory representing an actual position where the robot has moved, and generating a corrected program by adjusting the commanded trajectory; saving the corrected program; and carrying out relearning on a relearning location, the relearning location being a part of the operation trajectory designated by an operator.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Figure 1:
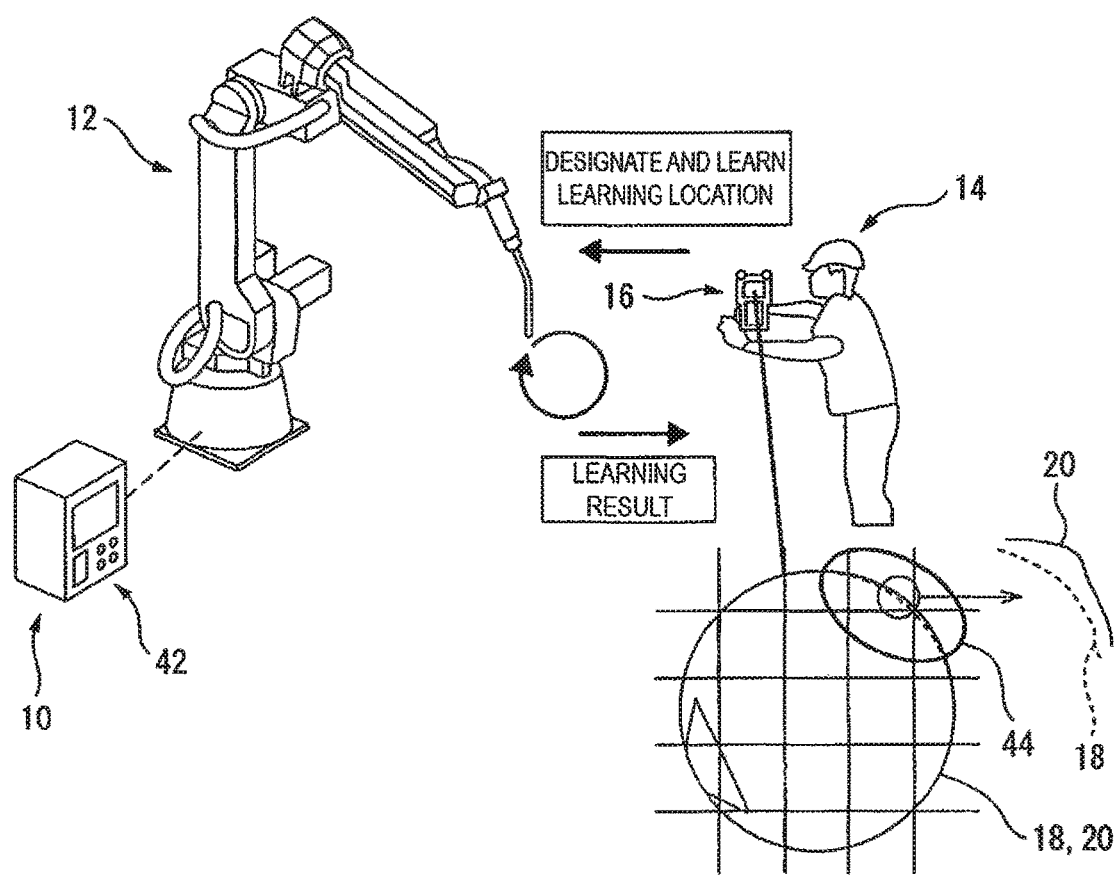
FIG. 1 is a diagram illustrating an example of learning control carried out by a robot controller according to an embodiment of the present invention.

FIG. 1 is a diagram illustrating a robot controller 10 according to an embodiment of the present invention, a robot (mechanical unit) 12 controlled by the robot controller 10, and a teaching pendant 16 used when an operator 14 teaches or operates the robot 12. FIG. 1 also illustrates an example of learning control carried out by the robot controller 10. In the present embodiment, the robot 12 is configured to irradiate a laser beam while moving along an arc or circular path, and cut a circular hole in a workpiece to be processed. The robot controller 10 also has a learning function for detecting a deviation in an operation trajectory 20 (the solid line) of the robot 12 relative to a commanded trajectory (arc) 18 indicated by the broken line and adjusting the commanded trajectory on the basis of the detected deviation.

Figure 2:
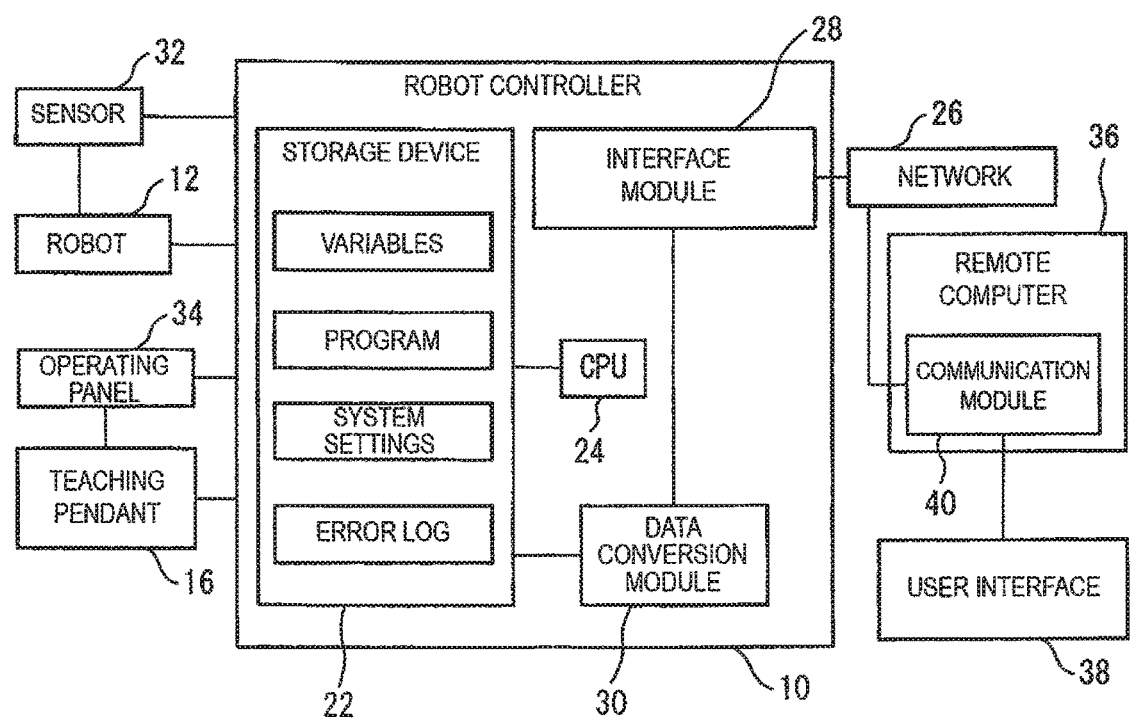
FIG. 2 is a function block diagram including the robot controller of FIG. 1.

FIG. 2 is a function block diagram including the robot controller 10, the robot 12, and the teaching pendant 16. The robot controller 10 is, for example, a programmable controller, and is configured to control the operation of the robot 12 in accordance with command values included in a program. The robot controller 10 includes: a storage device (saving section) 22 such as a memory; a processing unit 24, such as a processor or a CPU, having functions pertaining to operation control and/or learning control for the robot 12 (corresponding to a learning section and/or a relearning section described later); an interface module 28 for communicating with a network 26 such as an intranet or the Internet; and a data conversion module 30 configured to carry out data conversion between the interface module 28 and the storage device 22. The storage device 22 can also store various types of variables, a program for the teaching pendant (TP program), a program containing command values for controlling the operation of the robot, settings pertaining to the robot system of FIG. 1 (system settings), and a history of errors (an error log), etc.

The robot 12 is, for example, an articulated robot having a plurality of axes. The robot 12 has a sensor 32 for measuring/obtaining an operation trajectory (e.g. of a tool center point) of the robot 12 when the above-described arc operation is carried out, and the sensor 32 has, for example, a pulse coder or encoder provided at each axis of the robot 12.

The teaching pendant 16 is, for example, a portable operation panel that can be carried and operated by the operator 14 as illustrated in FIG. 1, and is connected to the robot controller 10 with a wire or wirelessly. The teaching pendant 16 has an operating panel (display) 34, such as a touch panel, that an operator can use to teach while viewing, instruct a learning location, which will be described later.

A remote computer 36 such as a personal computer can be connected to the network 26. The remote computer 36 has a user interface 38, such as a keyboard, through which an operator can make operations such as inputs, and a communication module 40 for data communication or data exchange with the network 26.

Figure 3:
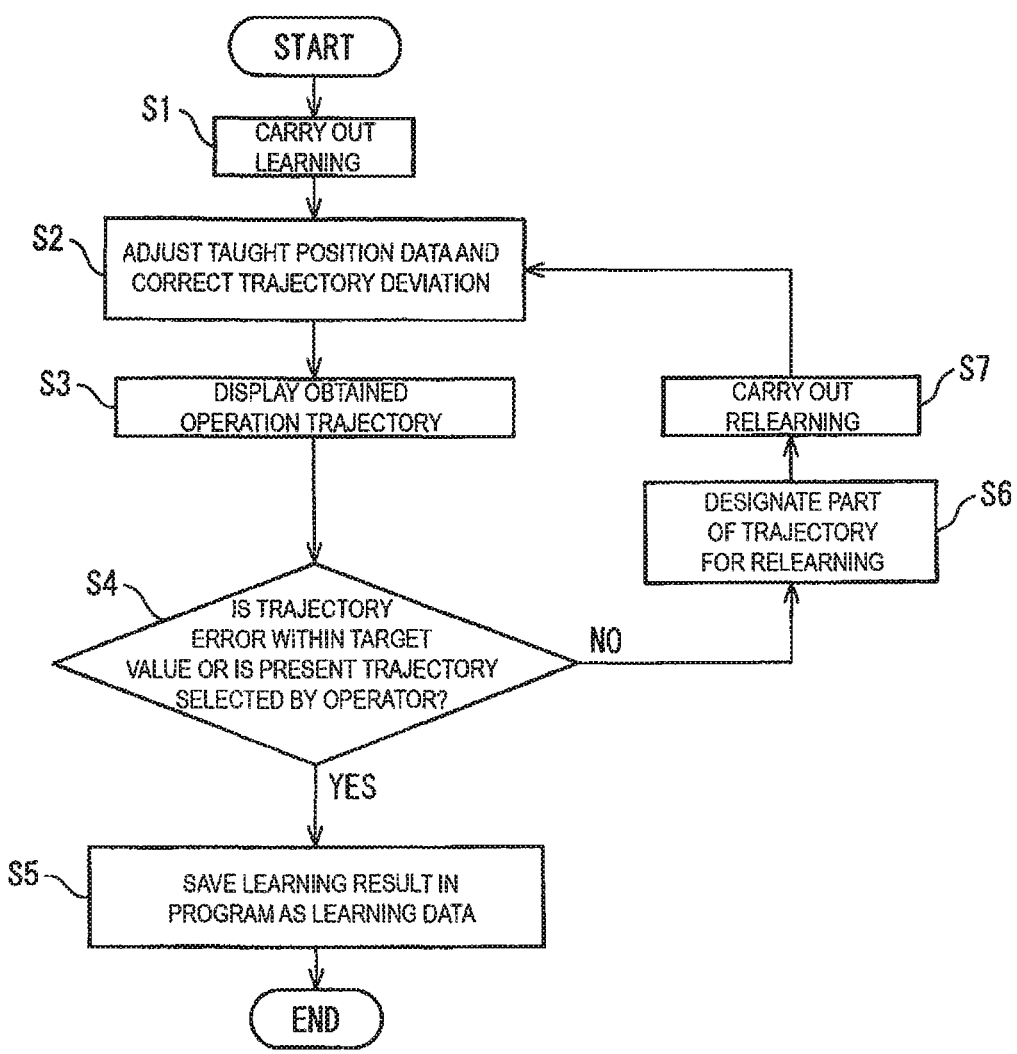
FIG. 3 is a flowchart illustrating an example of processing carried out by the robot controller of FIG. 1.

Next, the learning function of the robot controller 10 will be described with reference to the flowchart in FIG. 3. First, learning for arc operation carried out by the robot 12, as illustrated in FIG. 1, is carried out (step S1). To be more specific, a deviation between a commanded trajectory, representing a position of the robot 12 generated according to command values in a program, and an operation trajectory, representing an actual position where the robot 12 has moved, is detected. The program is then corrected by adjusting the commanded trajectory. Various types of machine learning, such as supervised learning, unsupervised learning, semi-supervised learning, reinforcement learning, transduction, or multitask learning, can be used as a specific example of a learning control method for learning the commanded trajectory (adjusting the operation trajectory), and the operator can designate which learning method to use. The operating panel 34 of the teaching pendant 16, the user interface 38 of the remote computer or an input section 42 of the robot controller 10, etc., can be used as an example of a designating section through which the operator makes the designation, but another means may be used instead.

Upon the learning being carried out, taught position data is corrected, and the deviation in the operation trajectory relative to the commanded trajectory is corrected by operation control based on the corrected position data (program) (step S2). Next, in step S3, the operation trajectory corrected on the basis of the corrected program is displayed in the operating panel 34, etc., preferably along with the commanded trajectory, as illustrated in FIG. 1.

The operator determines whether or not the operation trajectory (actual trajectory) is a desired shape on the basis of the displayed learning result (step S4). When the operation trajectory is the desired shape, or is slightly deviated from an ideal shape but still be acceptable, the operator adopts (selects) the current learning result by operating the teaching pendant 16. In response, the robot controller 10 saves the adopted learning result (the corrected program) as learning data in the storage device 22, etc. (step S5). Note that in step S4, whether the error between the operation trajectory and the commanded trajectory is within a predetermined target value may be automatically calculated and outputted (displayed).

On the other hand, as illustrated in FIG. 1, when the operation trajectory 20 is different from the trajectory intended by the operator, such as a case where the operation trajectory 20 contains a part with a high degree of error or a part that deviates greatly from the commanded trajectory 18, the operator designates a part of the operation trajectory to be relearned (step S6). In the example of FIG. 1, the operation trajectory 20 deviates greatly from a perfect circle (the commanded trajectory) in an upper-right part of the arc, but the other parts can be determined to have no problems. Accordingly, the operator makes a touch operation, etc., on an operating screen of the operating panel 34, etc., so as to designate/input a region 44 as a location to be relearned, which surrounds the upper-right part. Another suitable means, such as the user interface 38 of the remote computer or the input section 42 of the robot controller 10, can be used for the operating screen instead of the operating panel 34 of the teaching pendant 16. However, the operating panel 34 of the teaching pendant 16 is best suited to on-site usage.

Once the region 44 to be relearned has been designated, the robot controller 10 carries out relearning only for the trajectory contained within the designated region 44 (a relearning location) (step S7). The processing of step S2 and on is then iterated. This makes it possible to carry out learning only on parts to be learned, rather than carrying out learning on the entire trajectory, and thus an ideal trajectory desired by the operator can be learned in a short amount of time. Although an arc is described as an example of the commanded trajectory in the present embodiment, it is obvious that the present embodiment can be similarly applied in a case where the commanded trajectory has a different shape.

If learning is carried out on the entire operation trajectory in order to improve the accuracy of the operation trajectory of a robot, it may be difficult to obtain an ideal trajectory, since the entire trajectory, not a part thereof, may be changed. In the case where an attempt is made to learn only a part of the operation trajectory automatically, it is necessary to construct conditions and/or algorithms for identifying that part, and thus the processing takes time. Accordingly, in the present embodiment, the operator designates the location to be corrected, and partial learning is carried out on that location. This makes it possible to carry out learning that is efficient overall. In other words, even after learning has been carried out, a trajectory ideal for the operator can be obtained by designating a location to be further relearned and feeding that location back into the robot to carry out relearning. Further, the operator may judge whether or not each learning result is acceptable (OK or NG), and accumulated/statistical results of the judgment by the operator may be fed back to the robot.

Furthermore, by displaying the trajectory after the learning has been carried out in the operating screen such as the operating panel of the teaching pendant, etc., and making it possible to designate or input the location of the trajectory to be relearned from that operating screen, the operator can carry out the operations visually and easily.

According to aspects of the present disclosure, the time of a learning adjustment task can be shortened, and the task can be simplified.

While the invention has been described with reference to specific embodiments, it will be understood, by those skilled in the art, that various changes or modifications may be made thereto without departing from the scope of the following claims.

The invention claimed is:

1. A robot controller configured to control operations of a robot in accordance with command values of a program, the controller comprising:
 a processor configured to
  carry out learning of detecting a deviation between (i) a commanded trajectory representing a position of the robot generated according to the command values and (ii) an operation trajectory representing an actual position where the robot has moved, and generate a corrected program by adjusting the commanded trajectory, and
  carry out relearning on a relearning location, the relearning location being a part of the operation trajectory designated by an operator; and
 at least one memory configured to
  save the corrected program, and
  save a learning result adopted by the operator.

2. The robot controller of claim 1, wherein
the processor is configured to receive a designation of a method of the learning designated by the operator.

3. The robot controller of claim 1, further comprising:
an operating screen configured to
 display the operation trajectory after the learning, and
 receive the relearning location designated by the operator.

4. The robot controller according to claim 1, wherein
the robot is configured to accept accumulated statistical results of a judgment whether or not each learning result is adopted.

5. A robot control method of controlling operations of a robot in accordance with command values of a program, the method comprising:
 carrying out learning of detecting a deviation between a commanded trajectory representing a position of the robot generated according to the command values and an operation trajectory representing an actual position where the robot has moved, and generating a corrected program by adjusting the commanded trajectory;
 saving the corrected program;
 carrying out relearning on a relearning location, the relearning location being a part of the operation trajectory designated by an operator; and
 saving a learning result adopted by the operator.

* * * * *